(12) United States Patent
Nishimura et al.

(10) Patent No.: US 7,140,079 B2
(45) Date of Patent: Nov. 28, 2006

(54) CLIP FOR COUPLING WINDSHIELD TRIM TO A VEHICLE

(75) Inventors: Narumichi Nishimura, Dublin, OH (US); Michael S. Sutton, Upper Arlington, OH (US); Michael T. Binfet, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/680,423

(22) Filed: Oct. 8, 2003

(65) Prior Publication Data

US 2004/0117951 A1    Jun. 24, 2004

Related U.S. Application Data

(60) Provisional application No. 60/419,081, filed on Oct. 18, 2002.

(51) Int. Cl.
*A44B 21/00* (2006.01)
*A44B 1/18* (2006.01)

(52) U.S. Cl. ............... 24/289; 24/292; 24/297

(58) Field of Classification Search ............ 24/289, 24/290, 292, 297, 662; 411/508; 52/718.01, 52/208; 296/201, 187.05
See application file for complete search history.

(56) References Cited

U.S. PATENT DOCUMENTS

| 2,681,487 | A | * | 6/1954 | Ougljesa | 24/289 |
| 3,074,134 | A | * | 1/1963 | Buechler | 24/289 |
| 3,188,730 | A | * | 6/1965 | Meyer | 24/289 |
| 3,246,440 | A | * | 4/1966 | Meyer | 24/297 |
| 3,445,979 | A | | 5/1969 | Meyer | |
| 3,981,697 | A | * | 9/1976 | Buckthorpe | 52/204.597 |
| 4,216,637 | A | | 8/1980 | Kraus | |
| 4,636,915 | A | | 1/1987 | Perkins et al. | |
| 4,697,774 | A | | 10/1987 | Sarton et al. | |
| 4,698,882 | A | * | 10/1987 | Lang | 24/289 |
| 4,860,409 | A | * | 8/1989 | Bering et al. | 24/289 |
| 5,096,753 | A | | 3/1992 | McCue et al. | |
| 5,106,223 | A | | 4/1992 | Kraus | |
| 5,146,658 | A | | 9/1992 | Devismes | |
| 5,202,172 | A | * | 4/1993 | Graf | 24/292 |
| 5,283,096 | A | | 2/1994 | Greenberg et al. | |
| 5,288,530 | A | | 2/1994 | Maki | |
| 5,339,501 | A | | 8/1994 | Gugle et al. | |
| 6,564,433 | B1 | * | 5/2003 | Nagasawa | 24/297 |
| 6,772,484 | B1 | * | 8/2004 | Miyano et al. | 24/297 |

* cited by examiner

*Primary Examiner*—Jack W. Lavinder
(74) *Attorney, Agent, or Firm*—Sterne, Kessler, Goldstein & Fox P.L.L.C.

(57) ABSTRACT

A clip for securing trim to a body. A first portion of the clip has a first side configured to be mated against a surface of the body and a second, opposing side configured to mate with the trim. The second side has a device for securely coupling to the trim. A second portion of the clip is configured to be attached to the body. The second portion is disposed within a channel in the first portion. The first portion is slidable relative to the second portion along a first axis. The first portion may be moved relative to the second portion to permit adjustment of a position on the body of trim coupled to the first portion.

7 Claims, 7 Drawing Sheets

CLIP FOR COUPLING WINDSHIELD TRIM TO A VEHICLE

CROSS-REFERENCE TO RELATED APPLICATIONS

This application claims priority under 35 U.S.C. § 119(e) to U.S. Prov. Appl. No. 60/419,081 filed Oct. 18, 2002, which is incorporated by reference herein in its entirety.

BACKGROUND OF THE INVENTION

1. Field of the Invention

The present invention is related to a clip, and more particularly to a clip and method of using the clip to attach a trim strip to a vehicle.

2. Related Art

Many vehicles (i.e., automobiles) use a trim strip (or trim) to cover and/or seal the gap between a windshield and the body opening into which the windshield is mounted. In some cases, the trim strip helps to physically hold the windshield in place. In other cases, the trip strip is added solely to cover the adhesive and/or gasket that secures the window into the body opening to provide a more aesthetically pleasing appearance.

Conventional trim strips often span the gap between the windshield and the body opening and extend slightly over both the edge of the windshield and a portion of the body adjacent the windshield opening. While the adhesive and/or gasket provide the primary seal between the windshield and vehicle body, the seal also prevents dirt and debris from entering the gap. To function effectively, the trim strip must be securely attached and must be stable across its width. Ideally, the trim strip is attached relatively centrally over the width of the strip. This positioning becomes more important as the trim strip becomes wider. An ill fitting trim strip may be inadvertently dislodged or may allow dirt and debris to enter the gap.

Another problem occurs because of allowable tolerances. Trim strips are typically attached to the vehicle body using mounting holes or posts that are positioned on the body adjacent the windshield opening. Manufacturing tolerances in the shape of the windshield opening and/or the positioning of the mounting holes or posts can cause the trim strip to look uneven when attached or may cause the trim strip to not completely cover the gap.

Therefore, what is needed is a system and method for securing a trim strip to a vehicle that minimizes these and other problems.

SUMMARY OF THE INVENTION

Embodiments of the present invention provide a clip for securing a trim strip to a vehicle body A first portion of the clip has a flange device configured to mate with a corresponding flange device on the trim strip. A second portion of the clip slidably couples to the first portion to allow relative movement between the first and second portions along a first axis. The second portion is configured for secure mounting to a T-stud of the vehicle body.

Another embodiment of the present invention provides a method including attaching a clip having a first portion, a second portion, and a tongue to a T-stud of a vehicle and sliding the first portion with respect to the second portion until the tongue is in contact with the vehicle, such that the clip is properly aligned with the vehicle.

A further embodiment of the present invention provides a clip including a first portion configured to be fixedly attached to a vehicle and a second portion slidably engaging the first portion and configured for mounting of a trim thereon, the slidable engagement between the first and second portions permitting positioning of the trim with respect to the vehicle.

Yet another embodiment of the present invention provides a clip for securing trim to a body. A first portion of the clip has a first side configured to be mated against a surface of the body and a second, opposing side configured to mate with the trim. The second side has a device for securely coupling to the trim. A second portion of the clip is configured to be attached to the body. The second portion is disposed within a channel in the first portion. The first portion is slidable relative to the second portion along a first axis. The first portion may be moved relative to the second portion to permit adjustment of a position on the body of trim coupled to the first portion.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 5, 6, 7, and 8 show first through fourth stages of coupling a clip to a vehicle body according to embodiments of the present invention.

Figure 9:
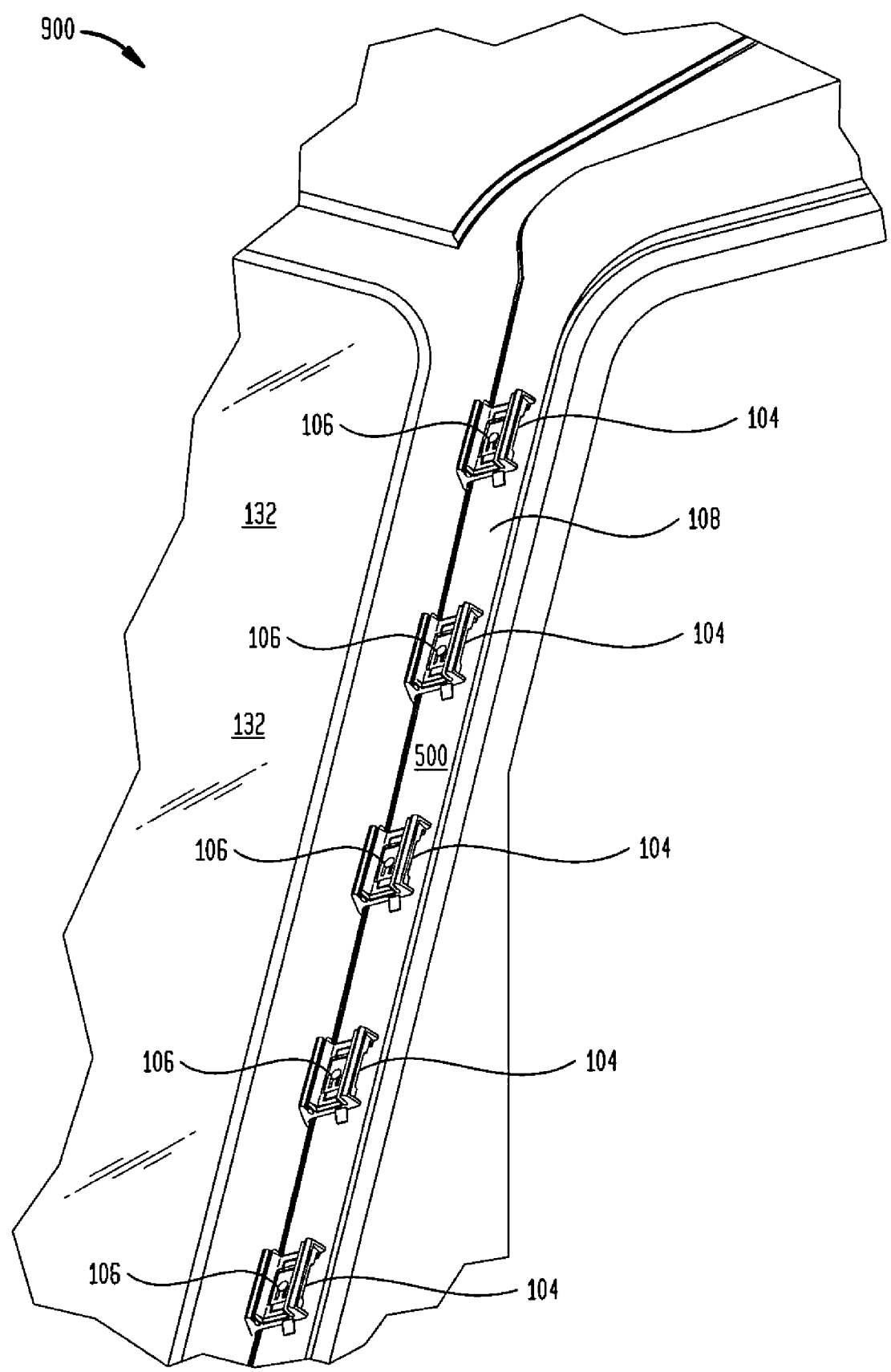

FIG. 9 is a view of several clips coupled to a vehicle body according to embodiments of the present invention.

The present invention will now be described with reference to the accompanying drawings. In the drawings, like reference numbers may indicate identical or functionally similar elements. Additionally, the left-most digit(s) of a reference number generally identifies the drawing in which the reference number is first or primarily used.

DETAILED DESCRIPTION OF THE EMBODIMENTS

Figure 1:
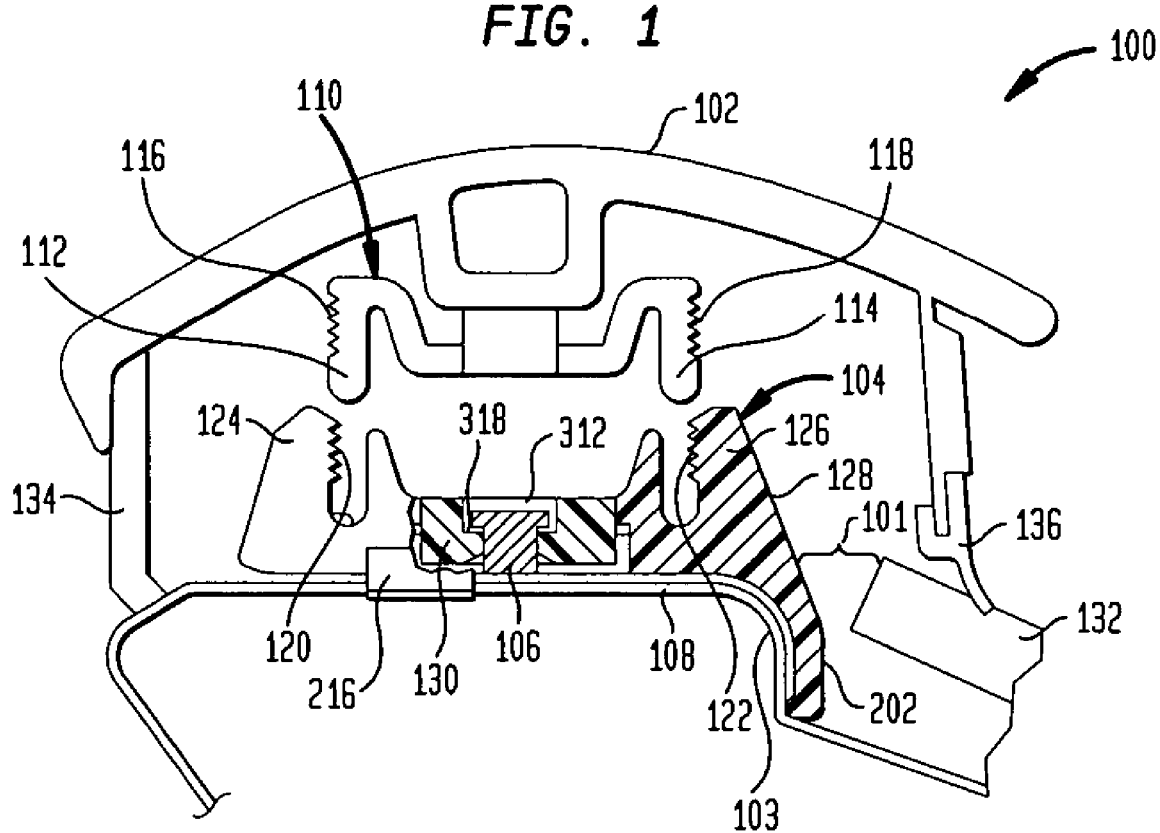
FIG. 1 is a cross-sectional view of a system according to embodiments of the present invention.

FIG. 1 shows a system 100 according to embodiments of the present invention. System 100 includes a trimming device 102 (e.g., a trim, a trim strip, or the like), a clip 104, and a T-stud 106 (e.g., a fastener) secured to a body 108 (e.g., a vehicle body, a body portion, etc.). Trim 102 includes a coupling device 110 having first and second flanges 112 and 114. Flanges 112 and 114 have teeth 116 and 118. Teeth 116 and 118 mate with teeth 120 and 122 on flanges 124 and 126 of a first portion 128 (e.g., first body portion) of clip 104. It is to be appreciated that, although flanges 124 and 126 of first portion 128 are shown as being a particular shape and size and as including teeth 120 and 122 on one surface thereof, other sizes and shapes can be used. A second portion 130 (e.g., a second body portion) of clip 104 slidingly engages with first portion 128 and is used to secure clip 104 to T-stud 106.

It is to be appreciated that corresponding flanges 112,114 and 124,126 can be configured in any number of ways, as long as they mate with one another to join trim 102 and clip 104. In addition, the use of two flanges on clip 104 and coupling device 110 is not critical. Instead, any number of flanges may be used in accordance with stability and cost considerations. It will be apparent to a person skilled in the art that these and other modifications may be made to this structure to achieve the same result.

Trim 102 covers and seals a gap 101 between an edge of vehicle windshield 132 and body 108. Trim 102 includes first and second sealing devices 134 and 136, extending from opposite ends of trim strip 102. Sealing devices 134 and 136 can be used to bring trim 102 into a sealing relationship with both windshield 132 and body 108. It is to be appreciated that a general configuration and purpose of trim 102 is well known in the art. It is also to be appreciated that other trim strips having various profiles, different seals, or the like, can be used, and are contemplated within the scope of the present invention.

Figure 2:
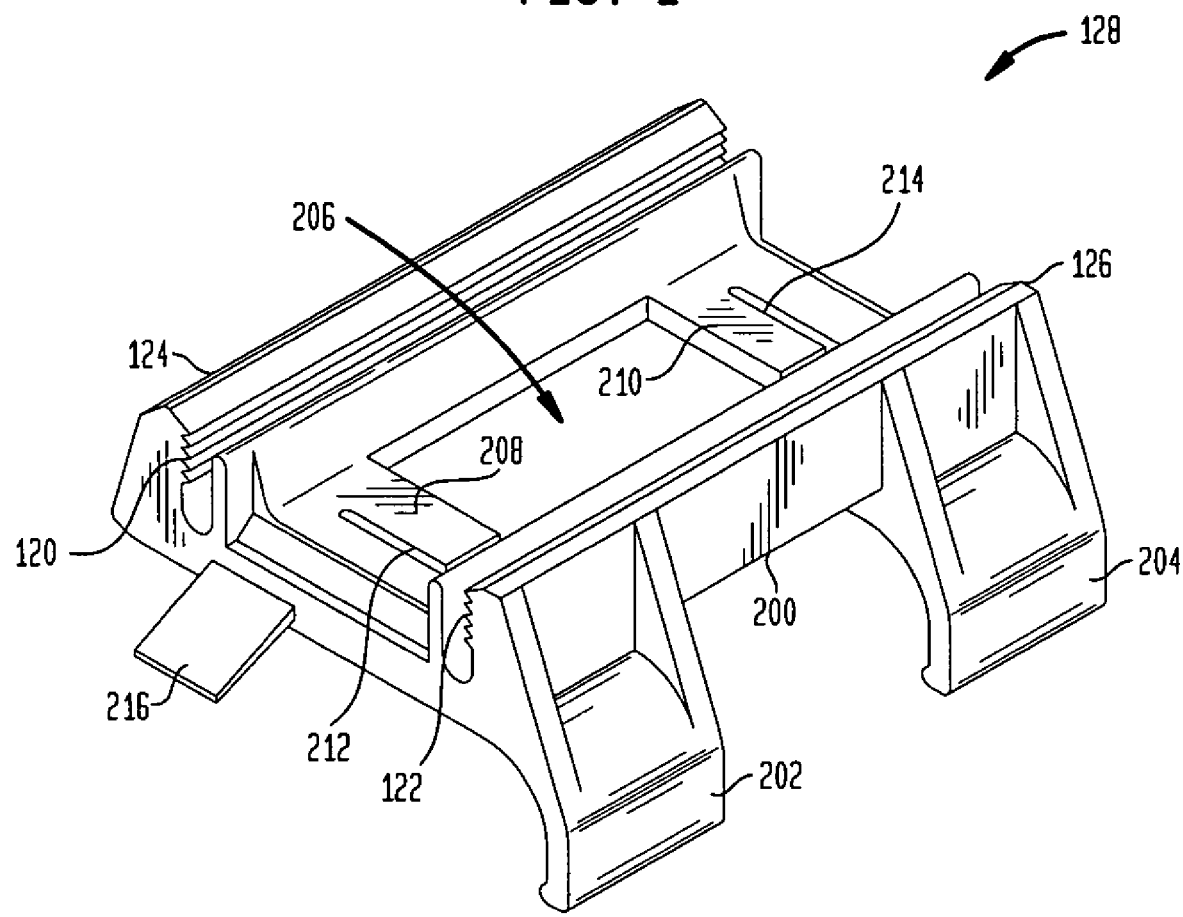
FIG. 2 is a perspective view of a first portion of clip according to embodiments of the present invention.

FIG. 2 shows a perspective view of first portion 128 of clip 104 according to embodiments of the present invention. First portion 128 includes an edge 200 with a pair of tongues 202 and 204 extending therefrom. As seen in FIG. 1, tongues 202 and 204 correspond generally in shape to an edge or ridge portion 103 of body 108. When clip 104 is placed in a desired optimal position to align trim 102 with the windshield opening in body 108, tongues 202 and 204 are positioned against ridge portion 103 of body 108. It is to be appreciated that the precise configuration of tongues 202 and 204 is not critical, so long as they are of a size and shape to engage or come into contact with the appropriate portion of body 108. In addition, although two tongues 202 and 204 are shown, a different number of tongues may be used in accordance with stability and cost considerations. It will be apparent to a person skilled in the art that these and other modifications may be made to this structure to achieve the same result.

With continuing reference to FIG. 2, first portion 128 also includes an opening 206 into which second portion 130 is received. On either side of opening 206 are sections 208 and 210 with slots 212 and 214. Although not shown in this figure, underneath sections 208 and 210 are teeth 400 and 402 (see FIG. 4) which are configured to mate with teeth 302 and 304 (see FIG. 3) on first and second sections 306 and 308 (see FIG. 3) of second portion 130. Teeth 302, 304 and teeth 400, 402 can be considered part of a ratchet device because they ratchet (or slide only in one direction) with respect to one another, as will be described in more detail below.

Figure 4:
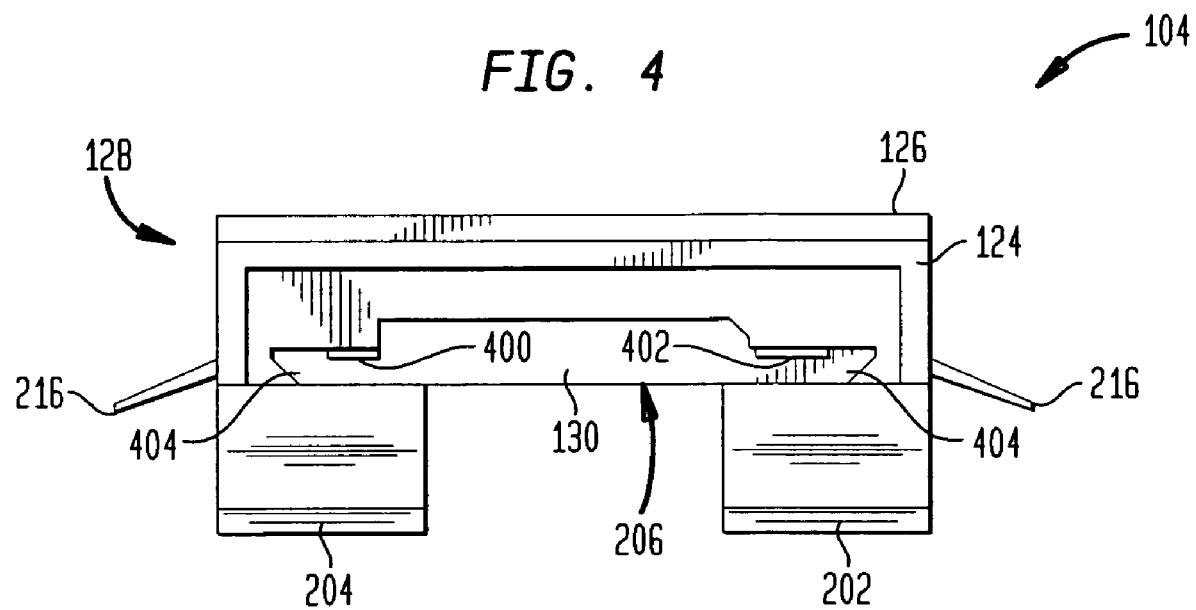
FIG. 4 is a side view of the first portion of the clip illustrating an opening 206 into which a second portion of the clip is to be received according to embodiments of the present invention.

With continuing reference to FIG. 2, first portion 128 can also optionally include a stabilizing device 216 (e.g., ears, or the like) extending therefrom. As seen in FIG. 4, stabilizing device 216 can have first and second portions extending symmetrically from opposite sides of first portion 128. As seen in FIGS. 5–9, stabilizing device 216 can be used to help stabilize clip 104 when it is coupled to body 108. This is accomplished, in part, by a natural resiliency of the material from which first portion 128 is formed. This natural resiliency exerts a biasing force between stabilizing device 216 and body 108.

Figure 3:
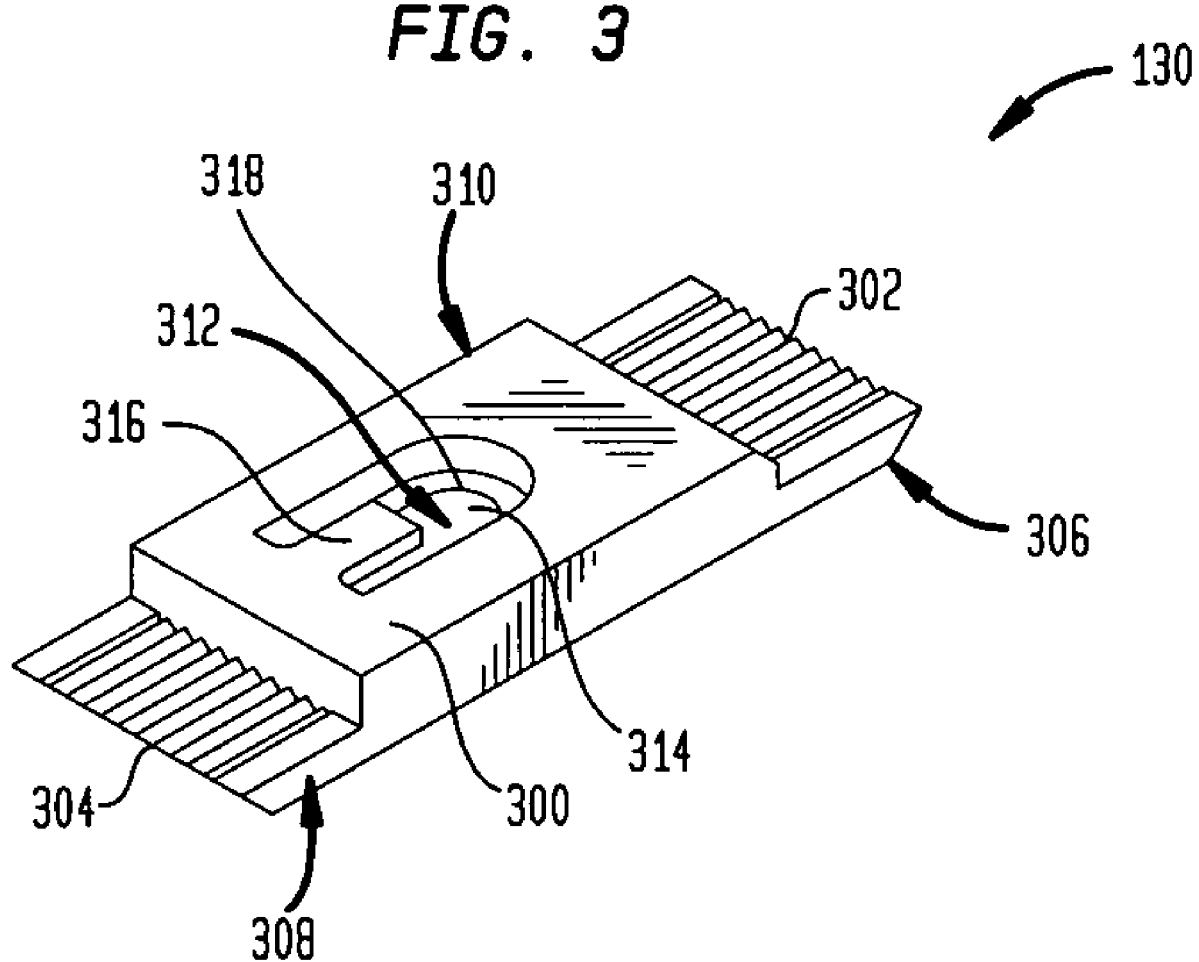
FIG. 3 is a perspective view of a second portion of clip according to embodiments of the present invention.

FIG. 3 is a perspective view of second portion 130 of clip 104 according to embodiments of the present invention. In addition to the elements described above, second portion 130 includes a third (or main) section 310. Third section 310 includes a cavity 312. Cavity 312 can be seen through an opening 314 in a surface 300. A stop 316 extends from surface 300 into opening 314. A shoulder 318 is located in cavity 312 (see FIG. 1). Operation of stop 316 and shoulder 318 to secure clip 104 to body 108 is discussed below.

FIG. 4 is side view of first portion 128 of clip 104 illustrating opening 206 and latitudinally extending grooves 404, which are configured to receive second portion 130 therein. As explained above, when second portion 130 is inserted into opening 206 of first portion 128 and along grooves 404, the ratchet functionality of teeth 400, 402 and 302, 304 allow normal movement of portion 130 in only one direction along grooves 404 (e.g., into the page in this figure) with respect to first portion 128. The teeth are held into engagement by a natural resiliency of the material from which first portion 128 is formed. This resiliency allows portions 208 and 210 to act like spring members. In order to move second portion 130 along grooves 404 in an opposite direction (e.g., out of the page in this figure) with respect to first portion 128, section 208 and 210 (FIG. 2) need to be lifted slightly. Lifting portions 208 and 210 allows teeth 302, 304 to disengage from teeth 400, 402.

FIGS. 5–8 illustrate mounting of clip 104 to a vehicle body according to an embodiment of the present invention.

Figure 5:
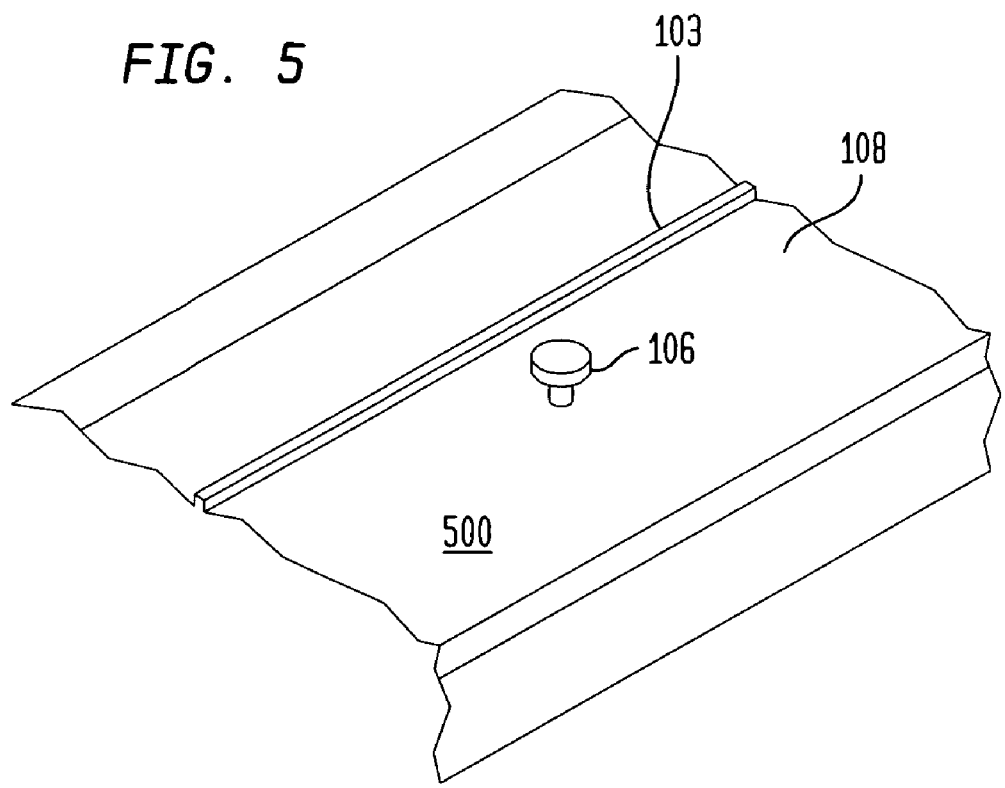

Referring first to FIG. 5, in a first stage, one T-stud 106 secured to a section 500 (e.g., an A-pillar) of body 108 is selected to receive clip 104.

Figure 6:
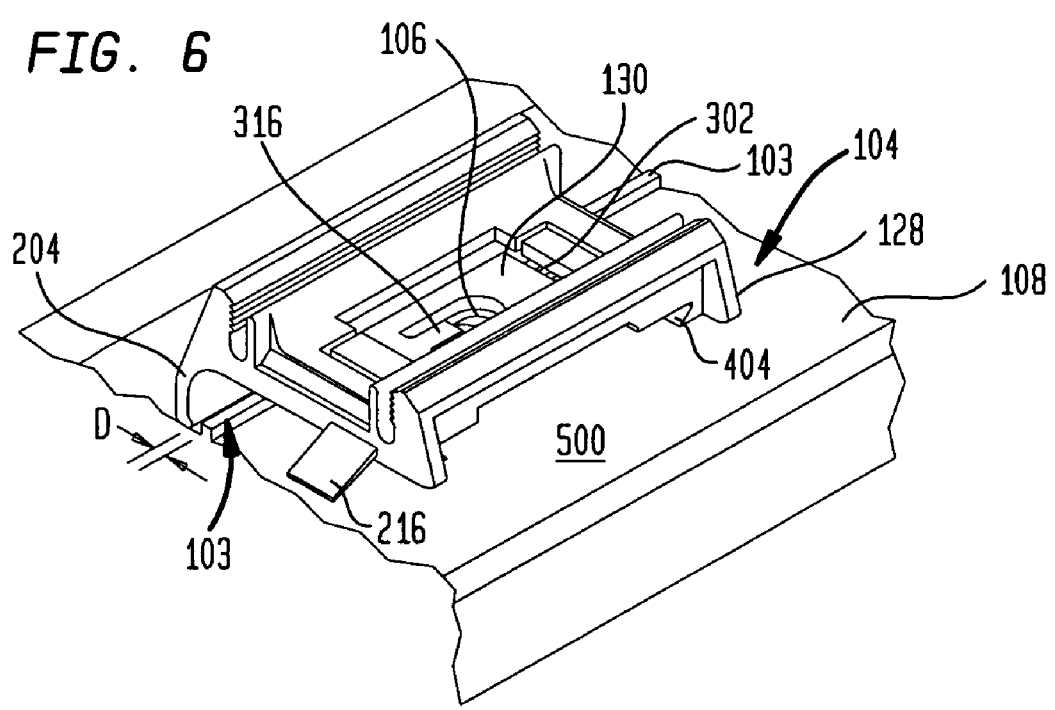

FIG. 6 shows a second stage of coupling clip 104 to body 108. In the second stage, clip 104 is positioned on T-stud 106 and pressed downward against T-stud 106 until a head of T-stud 106 deflects stop 316 of second portion 130 and enters cavity 312. In this initial position, tongues 202 and 204 are generally spaced a distance D from edge 103 of vehicle body 108. This spacing results from imprecise alignment of T-studs 106 with respect to edge 103.

Figure 7:
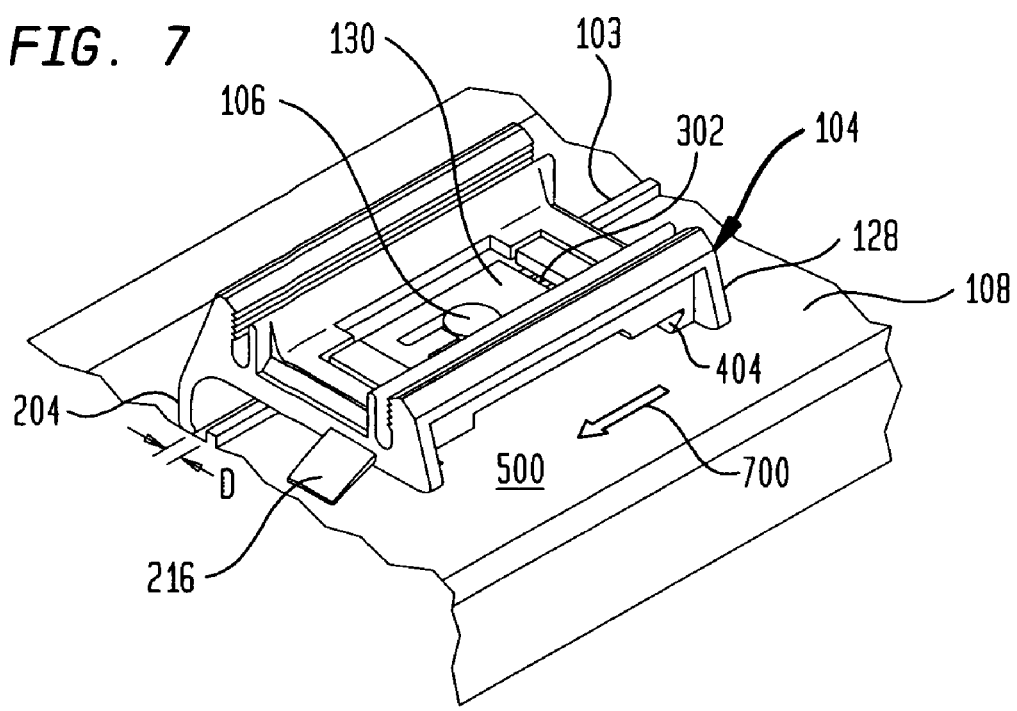

FIG. 7 shows a third stage of coupling clip 104 to body 108. In the third stage, clip 104 is moved in the direction of arrow 700. During this movement, T-stud 106 becomes securely engaged with shoulder 318. Once the head of T-stud 106 is fully engaged with shoulder 318, stop 316 snaps down from its deflected position to secure T-stud 106 in position against shoulder 318 and to prevent the head of T-stud 106 from retreating from this fully engaged position. This engagement between T-stud 106 and shoulder 318 secures clip 104 onto body 108.

Figure 8:
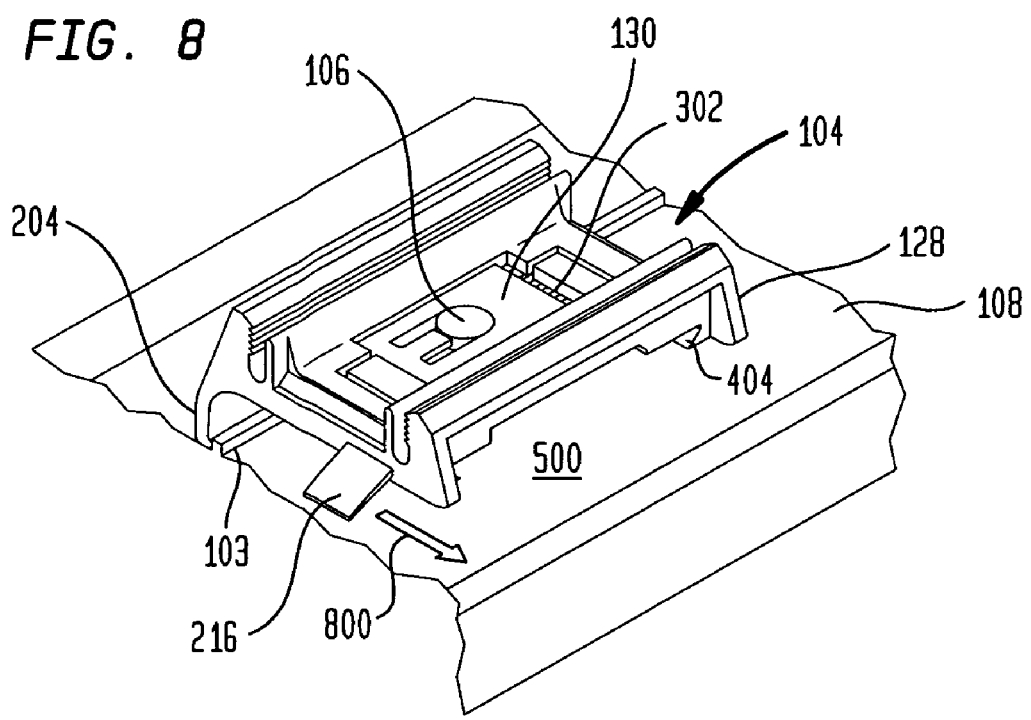

FIG. 8 shows a fourth or adjustment stage of coupling clip 104 to body 108 according to the present invention. In the fourth stage, first portion 128 is slid in the direction of arrow 800. This sliding movement caused a relative movement between first portion 128 (which is being moved) and second portion 130 (which is secured to T-stud 106). The ratcheting operation of teeth 302 and 304 against teeth 400 and 402 allows unencumbered movement in only a direction, which is indicated by arrow 800. The movement of first portion 128 ends when tongues 202 and 204 interact with edge 103 of body 108. In this position, clip 104 is positioned against edge 103 and precisely aligned therewith irrespective of the imprecise position of T-stud 106 on body 108.

FIG. 9 shows a portion 900 of vehicle body 108 having a plurality of clips 104 coupled to a plurality of T-studs 106 around an edge of windshield 132. Multiple T-studs 106 and clips 104 are used in this manner to maintain trim 102 in proper position around windshield 132. An exact number of clips and T-studs required to mount trim 102 is determined based on predetermined specifications, as is known in the art.

After all clips 104 are installed, trim 102 is attached to clips 104. Trim 102 is pressed onto each clip 104 manually or via a rubber mallet. Trim 102 is held in place by each clip 104 via complementary, mating teeth 116, 118 and 120, 122. Based on clip 104 being secured to body 108, as discussed earlier, trim 102 is aligned with edge 103 in an aesthetically pleasing manner and is securely held in place. It is to be appreciated that dimensions and shapes of parts of body 108, clip 104, and trim 102 can vary and can take whatever dimensions are desirable due to other design choices.

Taking into consideration required tolerances, the embodiment of the present invention discussed above has many advantages over conventional systems. For example, T-studs 106 are attached to body 108 at a desired position. However, the desired position may vary a few millimeters along the edge of the vehicle, due to manufacturing requirements. Notwithstanding this imprecise position of the T-studs, the clip of the invention allows a trim strip to be consistently placed a certain distance from an edge 103 of body 108. The one-way (e.g., unidirectional) sliding mechanism allows first portion 128 to move with respect to T-stud 106. This allows for adjustment to compensate for tolerances, while still ensuring that first portion 128 is positioned evenly around windshield 132. This also ensures trim 102 is positioned evenly around windshield 132, which results in an even, aesthetic appearance.

Referring again to FIGS. 1 and 9, once clip 104 is coupled to T-stud 106 and trim 102 has been coupled to clip 104, teeth 116, 118, 120, and 122 allow trim 102 to move up and down (e.g., vertically along) A-pillar 500. Thus, trim 102 can be vertically moved to position trim 102 in any desired vertical position. After being vertically positioned, trim 102 can be secured to A-pillar 500. Also, using teeth 116, 118, 120, and 122 can allow for thermal expansion of trim 102 along A-pillar 500.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A clip for securing a trim strip to a vehicle body, comprising:
   a first portion having,
      first and second spaced apart laterally extending grooves running from a first side to a second side of the first portion, each of the first and second grooves having teeth substantially along their length,
      an opening running from the first side to the second side of the first portion parallel to the first and second grooves and between the first and second grooves,
      a tongue device that is configured to interact with the vehicle body, and
      a flange device configured to mate with a corresponding flange device attached to the trim strip; and
   a second portion having,
      a body portion having a central opening, the opening configured to mate with a T-stud of the vehicle, and
      first and second spaced apart extensions extending from first and second sides of the body portion, the first and second extensions substantially corresponding in size to the first and second grooves, the first and second extensions having teeth substantially along their length that are complementary and corresponding to the teeth of the first and second grooves,
   wherein the body portion is received through the opening in the side of the first portion such that the first and second extensions are received into corresponding ones of the first and second grooves and the second portion is slidably coupled within the first portion to allow relative movement between the first and second portions, and
   wherein the teeth of the first and second extensions are configured to ratchet with respect to the teeth of the first and second grooves, such that the relative movement is only in one direction to allow adjustment of, and thereafter maintain, a position of the tongue device with respect to the T-stud so that the tongue device is brought into contact against the vehicle body after (a) the second portion is secured to the T-stud and (b) the first portion is moved relative to the second portion to position the tongue device against the vehicle body.

2. The clip of claim 1, wherein said flange device of said first portion comprises:
   teeth that mate with complementary teeth of said flange device of said trim strip.

3. The clip of claim 1, wherein each of the flange devices comprises first and second flange sections.

4. The clip of claim 1, wherein the tongue device comprises first and second tongue sections.

5. The clip of claim 1, wherein the first body portion further comprises a stabilizing device that interacts with the vehicle body.

6. The clip of claim 5, wherein the stabilizing device comprises first and second extensions.

7. The clip of claim 1, wherein the body portion of the second portion further comprises:
   a stop; and
   a shoulder section,
   wherein the T-stud is received in the central opening and held in engagement with the shoulder section by the stop.

* * * * *